US008086376B2

(12) United States Patent
McCoy et al.

(10) Patent No.: US 8,086,376 B2
(45) Date of Patent: Dec. 27, 2011

(54) VEHICLE ROLLOVER PREDICTION WITH OCCUPANT RESTRAINT SYSTEM ACTIVATION

(75) Inventors: Robert William McCoy, Ann Arbor, MI (US); Jialiang Le, Canton, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 1112 days.

(21) Appl. No.: 11/907,298

(22) Filed: Oct. 10, 2007

(65) Prior Publication Data

US 2009/0099735 A1 Apr. 16, 2009

(51) Int. Cl.
*G05D 1/00* (2006.01)
*B60G 17/016* (2006.01)
(52) U.S. Cl. ............... 701/46; 701/38; 701/45; 340/440
(58) Field of Classification Search .................. None
See application file for complete search history.

(56) References Cited

U.S. PATENT DOCUMENTS

| 6,036,225 | A | 3/2000 | Foo et al. | |
|---|---|---|---|---|
| 6,618,655 | B2 | 9/2003 | Tobaru et al. | |
| 6,654,671 | B2 | 11/2003 | Schubert | |
| 6,714,848 | B2 * | 3/2004 | Schubert et al. | 701/46 |
| 6,889,128 | B2 | 5/2005 | DeBoni | |
| 6,898,498 | B1 | 5/2005 | Wessels et al. | |
| 6,994,375 | B2 | 2/2006 | McCoy | |
| 7,057,503 | B2 | 6/2006 | Watson | |
| 7,076,353 | B2 * | 7/2006 | Ogata et al. | 701/45 |
| 7,236,864 | B2 * | 6/2007 | Ogata et al. | 701/38 |
| 2005/0154509 | A1 | 7/2005 | Schubert et al. | |
| 2005/0159864 | A1 * | 7/2005 | Ogata et al. | 701/38 |
| 2006/0027412 | A1 | 2/2006 | Geborek | |
| 2006/0064218 | A1 * | 3/2006 | Subbian et al. | 701/45 |
| 2011/0006890 | A1 * | 1/2011 | Le et al. | 340/440 |

OTHER PUBLICATIONS

Le et al., Early Detection of Rollovers with Associated Test Development, SAE Technical Paper Series 2005-1-0737, 2005 SAE World Congress, Apr. 11-14, 2005.
McCoy et al., Analysis of a Prototype Electric Retractor, a Seat Belt Pre-Tensioning Device and Dummy Lateral Motion Prior to Vehicle Rollover, SAE Technical Paper Series 2005-01-0945, 2005 SAE World Congress, Apr. 11-14, 2005.
McCoy et al., A Study of Kinematics of Occupants Restrained with Seat Belt Systems in Component Rollover Tests, SAE 2007-1-0709.

* cited by examiner

*Primary Examiner* — Khoi Tran
*Assistant Examiner* — Ian Jen
(74) *Attorney, Agent, or Firm* — O'Brien Jones PLLC

(57) ABSTRACT

An automobile rollover prediction and restraint device deployment system comprises a plurality of automobile data sensors to generate a plurality of data signals, and a controller to receive the data signals and configured to deploy resettable and non-resettable restraint devices. The controller is configured to activate at least one resettable restraint device when one or more of the data signals exceed a first threshold, indicating that the vehicle is in a position or undergoing movement that indicates a potential for vehicle rollover, and to de-activate the at least one resettable restraint device when one or more of the data signals fall below the first threshold.

21 Claims, 7 Drawing Sheets

| SIGNALS | PRE-ROLL | | ROLL | |
|---|---|---|---|---|
| | STAGE 1 | STAGE 2 | STAGE 1 | STAGE 2 |
| ROLL RATE | X | X | X | X |
| YAW RATE | X | X | X | |
| STEERING WHEEL ANGLE RATE | X | X | X | |
| STEERING WHEEL ANGLE | X | X | X | |
| LATERAL ACCELERATION | X | X | X | X |
| LONGITUDINAL ACCELERATION | X | X | | |
| VERTICAL ACCELERATION | | | X | X |
| VEHICLE SPEED | | X | X | X |
| SIDE SLIP ANGLE | | X | X | X |
| TIRE PRESSURE | X | X | X | X |

VEHICLE ROLLOVER PREDICTION WITH OCCUPANT RESTRAINT SYSTEM ACTIVATION

FIELD

The present invention is directed to event detection and occupant restraint system activation in a motor vehicle, and more particularly to a rollover prediction and detection method that allows early and accurate activation of resettable occupant restraint devices and resetting of those occupant restraint devices when appropriate.

INTRODUCTION

Various rollover detection methodologies have been developed for activating occupant restraint devices such as air bags, side curtains, safety canopies, seat belt pretensioners, and pop-up roll bars. Most methodologies involve monitoring the roll angle and roll velocity of the vehicle or various acceleration components with suitable sensors, and executing a path control algorithm that deploys certain occupant restraint devices if a rollover becomes probable and deploys additional occupant restraint devices upon detecting an actual rollover.

Seat belt pretensioning is advantageous because it can maintain a vehicle occupant in a position more favorable for deployment of inflatable restraint devices. Existing methodologies may not predict a rollover as early and as accurately as possible. Thus, seat belt pretensioning, when possible, may not occur to as beneficial an extent as possible prior to deployment of an inflatable restraint device such as an airbag, side curtain, or safety canopy.

Certain rollover studies have shown that a vehicle may experience various degrees of yaw and lateral slide (e.g., during skidding) prior to rolling over. Such pre-crash vehicle motion can generate forces that influence occupant kinematics prior to a crash event, perhaps causing occupants to take a position that is not ideal in the event of inflatable restraint deployment. For example, as a vehicle begins to roll, for example toward a driver's side, the driver's lower torso typically moves off the seat as his upper torso translates laterally until contacting the left front door trim. The driver's head continues to translate laterally until it contacts the left front window pane. This movement can happen in less than 100 ms. If the vehicle transitions to a free-flight rotation phase, the driver's head and torso translate inboard toward the passenger side and the upper interior of the vehicle, and continue to move vertically—relative to their initial position—until the head makes contact with the upper interior of the vehicle. During a possible subsequent ground contact phase, the driver's head may remain in contact with the upper interior of the vehicle as his torso moves toward the upper interior of the vehicle, potentially resulting in neck compression.

In such a rollover, at initiation, a front seat passenger's lower torso typically moves off the seat as his upper torso and head translate laterally toward the driver and away from the seatbelt d-ring. It is possible for the seatbelt to then slide from the passenger's shoulder, and the passenger can then continue to translate laterally. If the vehicle transitions to a free-flight rotation phase, the passenger's motion is reversed and translated toward the right front door and window, likely until the upper torso contacts the right front door. The passenger can continue to translate toward the upper interior of the vehicle until his head reaches a position near the intersection of the window pane, the B-pillar, and the roof rail. During a possible subsequent ground contact phase, rapid deceleration of the vehicle can cause the passenger's torso to move toward the upper interior of the vehicle, potentially resulting in neck compression.

Early and accurate pretensioning of seat belts may reduce out-of-position (OOP) injury caused by the above-described occupant kinematics if an inflatable restraint device is deployed. To afford such a reduction, pretensioning devices should be activated prior to the vehicle's roll initiation phase. This requires earlier prediction of roll initiation or the potential therefore.

Known vehicle restraint devices may include a standard 3-point seat belt system with a combination of a buckle-mounted pyro-mechanical pretensioner and a motorized electric or conventional load limiting retractor. When activated, a motorized retractor utilizes an electric motor to rotate the belt spool and apply a tension force to the belt system. Additional tension can then be applied to the seat belt system, e.g., during a potential rollover, by activating the buckle-mounted pyro-mechanical pretensioner. In general, the force applied to the belt system by the motorized retractor is much less and over a longer period of time than the buckle-mounted pyro-mechanical pretensioner.

A safety canopy utilizes side curtain airbags to protect vehicle occupants in certain side-impact and rollover situations. A safety canopy can deploy from above the sheet metal roof rail between the A-pillar and C-pillar on two-row vehicles, and between the A-pillar and D-pillar on three-row vehicles, to cover side glass areas to protect occupants in outboard seating positions. Inflators for the airbags can be located near the roof rail between the side pillars. The safety canopy may remain inflated for a longer period of time to help prevent injuries from multiple impacts or rollovers.

In addition to increasing driver safety, it is also desirable to consider customer satisfaction. Customer satisfaction may decrease if vehicle occupants are restrained in their seats, even temporarily, when a crash or rollover is not imminent. In addition, customer satisfaction may decrease if customers have to replace non-resettable safety restraints when a crash or rollover did not occur. Existing methodologies for deploying occupant restraint systems do not effectively utilize and reset resettable restraint devices such as, for example, seat belt pretensioners and retractors.

SUMMARY

The present invention may address one or more of the above-mentioned issues. Other features and/or advantages may become apparent from the description which follows.

Certain embodiments of the present invention provide a method for predicting vehicle rollover and activating an occupant restraint system. The method comprises: receiving input signals for early detection of one or more of a vehicle position and vehicle movement that indicate a potential for vehicle rollover; determining, based on certain of the input signals, when a first pre-rollover stage threshold has been met; activating at least a first resettable restraint device when the first pre-rollover stage threshold has been met; determining, based on certain of the input signals, when a second pre-rollover stage threshold has been met; activating at least another resettable restraint device when the second pre-rollover stage threshold has been met; determining, based on certain of the input signals, when a first rollover stage threshold has been met; activating at least a first non-resettable restraint device when the first rollover stage threshold has been met; determining, based on certain of the input signals, when a second rollover stage threshold has been met; and activating at least another non-resettable restraint device when the second rollover stage threshold has been met.

Certain embodiments of the present invention provide a method for detecting one or more of a vehicle position and vehicle movement that indicate a potential for vehicle rollover, and activating an occupant restraint system. The method comprises: receiving input signals for early detection of one or more of a vehicle position and vehicle movement that indicate a potential for vehicle rollover; determining, based on certain of the input signals, whether at least three thresholds are met prior to initiation of vehicle rollover; and activating restraint devices as each of the at least three thresholds are met to keep vehicle occupants from moving within the vehicle to positions that are less suitable for inflatable restraint device deployment.

Certain embodiments of the present invention provide an automobile rollover prediction and restraint device deployment system that comprises a plurality of automobile data sensors to generate a plurality of data signals, and a controller to receive the data signals and configured to deploy resettable and non-resettable restraint devices. The controller is configured to activate at least one resettable restraint device when one or more of the data signals exceed a first threshold, indicating that the vehicle is in a position or undergoing movement that indicates a potential for vehicle rollover, and to de-activate the at least one resettable restraint device when one or more of the data signals fall below the first threshold.

In the following description, certain aspects and embodiments will become evident. It should be understood that the invention, in its broadest sense, could be practiced without having one or more features of these aspects and embodiments. It should be understood that these aspects and embodiments are merely exemplary and explanatory and are not restrictive of the invention.

BRIEF DESCRIPTION OF THE DRAWINGS

Features and advantages of the claimed subject matter will be apparent from the following detailed description of embodiments consistent therewith, which description should be considered with reference to the accompanying, wherein:

Although the following detailed description makes reference to illustrative embodiments, many alternatives, modifications, and variations thereof will be apparent to those skilled in the art. Accordingly, it is intended that the claimed subject matter be viewed broadly.

DETAILED DESCRIPTION OF VARIOUS EXEMPLARY EMBODIMENTS

Reference will now be made to various embodiments, examples of which are illustrated in the accompanying drawings. However, these various exemplary embodiments are not intended to limit the disclosure. On the contrary, the disclosure is intended to cover alternatives, modifications, and equivalents.

Various exemplary embodiments in accordance with the present teachings contemplate detecting certain pre-crash motion and activating certain restraint devices when conditions are such that the occupant may be dynamically moving out of position due to pre-crash vehicle motion. For example, pre-tensioning or seatbelt locking at the onset of vehicle lateral slide can maintain occupant position relative to, e.g., the curtain deployment zone. Such restraint device activation can make inflatable restraint devices, when activated, more effective.

In addition, various exemplary embodiments contemplate predicting conditions for which side slip and/or tripping may occur, particularly at a level that makes vehicle rollover probable. For example, an evaluation of a vehicle's forward energy can be used to predict a rollover incident because it can transition to lateral energy in certain conditions.

By understanding the effect of pre-crash motion on vehicle occupants and the tendency of certain pre-crash vehicle motion to result in a rollover or other scenario causing inflatable restraint deployment, restraint devices can be activated earlier and more accurately. Light impact forces, for example, may not trigger safety restraints, but may force an occupant out of position and cause other actions that should require restraint activation and deployment. By understanding the effect that vehicle movement has on vehicle occupants and the vehicle's tendency to rollover or crash, tracking vehicle motion can allow restraint devices to better maintain vehicle occupants earlier in a desired position for inflatable restraint device deployment.

The various exemplary embodiments provide methods and systems for predicting automobile rollover events and deploying occupant restraint systems. Some embodiments of the present invention can be used in automobiles of various types to predict or determine whether a rollover or crash event will occur or is occurring. Some embodiments can use an algorithm to deploy and/or reset, or activate and de-activate, one or more occupant restraint systems upon predicting (or sensing) a rollover event to a given certainty. The occupant restraint systems can be reset automatically, manually, or both automatically and manually, for example allowing a manual override if automatic resetting is unsuccessful.

Figure 1:
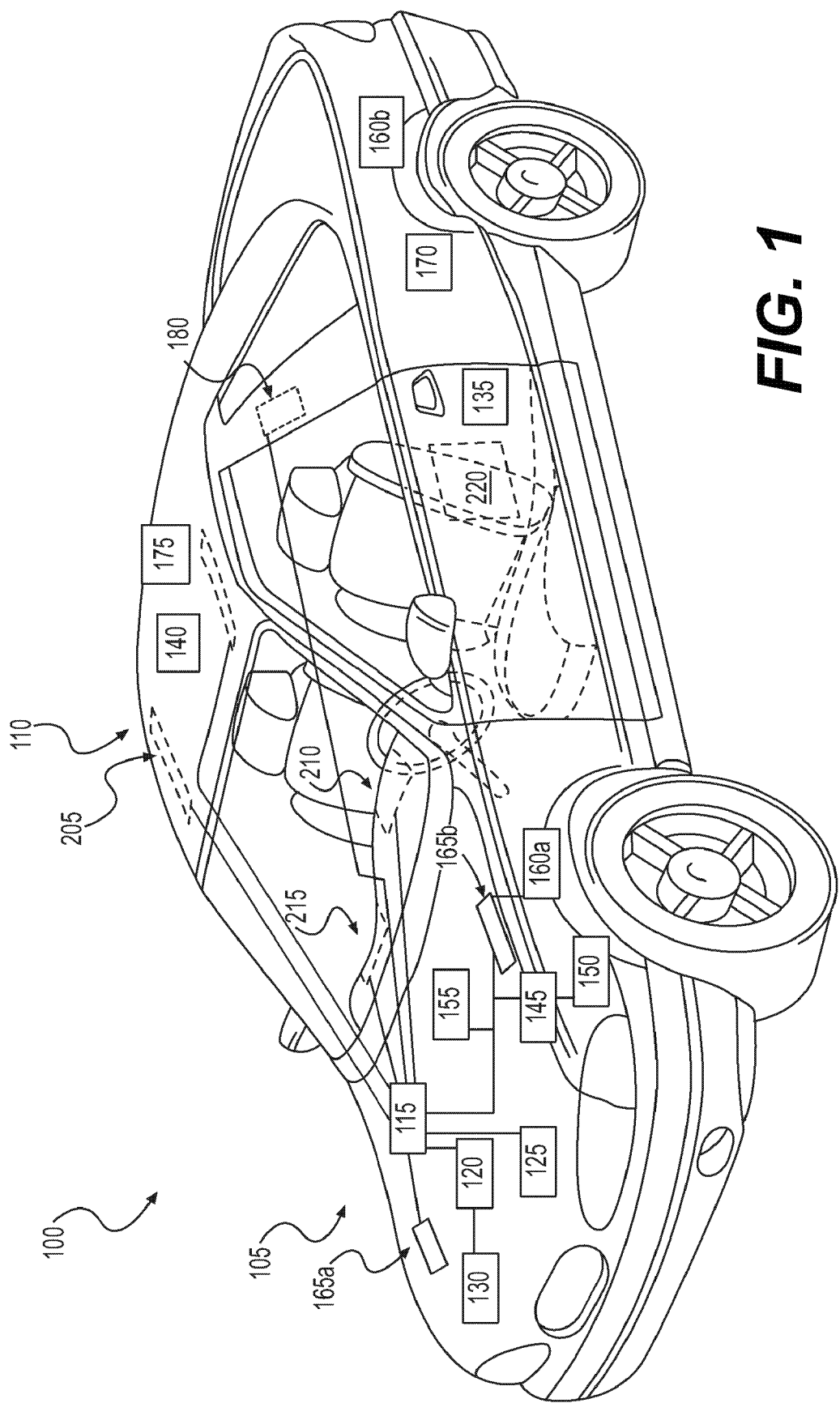
FIG. 1 illustrates an automobile for use with an exemplary embodiment of the present teachings.

Referring to the drawings, FIG. 1 is a perspective view of an automobile for use with an exemplary embodiment of the present teachings. As illustrated, a vehicle 100 has a rollover sensing system 105 coupled to an occupant restraint system 110. Although vehicle 100 is depicted as a car, vehicle 100 can be any type of vehicle including a truck, a van, a minivan, a sport utility vehicle, or other automotive vehicle. According to an exemplary embodiment of the invention, the rollover sensing system 105 can comprise a control circuit 115 (the term "control circuit," as used herein, can include a control module or a controller), a roll rate sensor 120, a roll angle detector 125, a longitudinal accelerometer 130, a side acceleration accelerometer 135, a vertical accelerometer 140, a yaw rate sensor 145, a side slip angle sensor 150, a vehicle speed sensor 155, vehicle weight sensors 160a and 160b, one or more lateral accelerometers 165a and 165b, a ride height sensor 170, a tire pressure sensor, and an inertia sensor 175. Other sensors can also be utilized in some embodiments of the invention including, for example, a window status sensor 180, a seatbelt buckle status sensor (not shown), steering wheel sensor (not shown), and wheel status sensors (not shown). The sensors whose signal input is utilized for rollover prediction/detection and/or occupant restraint system deployment provide data directly or indirectly to the control circuit 115. A pre-rollover and rollover prediction and occupant restraint system deployment algorithm, in accordance various exemplary embodiments, is executed by the control circuit 115.

Those ordinarily skilled in the art will understand that the placement of the sensors in FIG. 1 is for illustrative exemplary purposes and that the actual placement of such sensors can vary among vehicles or systems of the present invention. Some of the sensors can be used to generate signal inputs for ancillary algorithms or to calculate data based on the sensor signals that can be used in various exemplary embodiments of the present teachings. For example, roll angle and side slip angle data can be sensed or can be calculated based on one or more other sensor signals (e.g., via a roll stability control unit as described in U.S. Pat. No. 7,130,735, the entire disclosure of which is incorporated herein by reference). Similarly, various moment of inertia signals and acceleration signals can be calculated using other signals to determine their values.

Sensors used in accordance with the various exemplary embodiments of the present teachings can comprise sub-parts such that the sensors can sense data from various parts of vehicle 100. For example, a vehicle weight sensor can comprise multiple sensors 160a, 160b to record vehicle weight data in different areas of vehicle 100. The sensors used in accordance with various exemplary embodiments of the invention can be electrically or wirelessly coupled to control circuit 115, any other sensor, and/or another vehicle data system.

Control circuit 115 can have various features in controlling the rollover sensing system 105. Control circuit 115 can have any number and variety of inputs and outputs depending on the implementation of rollover sensing system 105. Control circuit 115 can be microprocessor-based, or can be implemented with software, hardware, or a combination of both. Additionally, control circuit 115 can be capable of receiving and transmitting wireless signals to and from the sensors or to and from other wireless devices such as an emergency call system or an automotive repair system. Control circuit 115 can be devoted to the occupant restraint system 110, or can be shared with the occupant restraint system 110 and/or other functionality for the vehicle. Control circuit 115 can be adapted to determine the thresholds for a number of pre-rollover and rollover stages in response to nominal vehicle values including center of gravity height, track width, vehicle mass (including any payload), vehicle moment of inertia, sprung mass moment of inertia, and suspension characteristics, because such values can vary for each vehicle and can affect how a vehicle will respond to certain factors such as, for example, lateral speed and tripping. In some exemplary embodiments, various data sensors can sense at least some of these nominal vehicle values. Some nominal vehicle values can alternatively be pre-programmed or pre-set. Control circuit 115 can also be adapted to update existing thresholds, for example to reflect any changes in a vehicle's propensity to rollover.

In an exemplary embodiment of the present teachings, the input signals are pre-processed, where pre-processing can include one or more of low pass filtering, noise removal, and drift removal. Input signals can be provided to the control circuit 115 wirelessly or via a hard-wired connection. The input signals can be provided to the control circuit 115 via dedicated input lines and/or via a communication bus permitting sharing of the signals among multiple controllers in the vehicle where applicable.

Various exemplary embodiments of the present teachings contemplate the thresholds for the pre-rollover and rollover stages being dynamic thresholds, static thresholds, or both. The thresholds can be based on the particular vehicle and can also depend on one or more of a vehicle initial angle signal, a speed signal, an acceleration signal, a tire pressure signal, a steering wheel status signal, a roll angle signal, a roll rate signal, a yaw rate signal, and a lateral acceleration signal, for example. A methodology and system in accordance with the present teachings can be based on the vehicle undergoing movement or being in a position that indicates a potential for vehicle rollover, rather than using a traditional energy-based rollover prediction. Movement or positions that indicate a potential for vehicle rollover can include, for example: when a vehicle's trajectory is altered by physical contact with another vehicle or object; when the pressure of a vehicle's tire rapidly decreases; when a driver inputs rapidly changing steering rates and angles; or when a vehicle leaves the roadway and experiences high lateral accelerations and velocities. In an exemplary embodiment of the invention, thresholds for determining various pre-rollover and rollover stages can additionally depend on one or more data signals including, but not limited to, for example, a window status signal, a seatbelt status signal, and/or a position of a vehicle occupant within the vehicle. Such information can be used to determine whether, when, and how to deploy certain available occupant restraint devices. For example, it may be desirable to deploy an inflatable restraint device during a lesser frontal collision if the occupant is not wearing a seat belt or other passive restraint device.

Control circuit 115 can also control and initiate an occupant restraint system 110 in accordance with the present teachings. Occupant restraint system 110 can comprise various restraint devices. Such devices can include an inflatable curtain airbag 205 such as, for example, a safety canopy, a driver side front airbag 210, a passenger side front airbag 215, one or more side airbags 220, a re-settable belt retractor such as an advanced rollover seat belt buckle or other type of retractor (not shown), a pyro-buckle pretensioner (not shown), and/or vision/radar-based pre-crash passive safety systems (not shown). The advanced rollover seat belt buckle is described in detail in U.S. Pat. No. 6,994,375, the disclosure of which is incorporated herein by reference in its entirety.

One or more of these restraint devices can be used in the various exemplary embodiments of the present teachings and control circuit 115 can be adapted to activate these restraint devices at the same time or at different times as thresholds are met, signifying entry of the vehicle into pre-rollover and rollover stages in accordance with the present teachings. Various other sensors and separate controllers can also be used in some embodiments to control the occupant restraint devices. Control circuit 115 can deploy the restraint devices by generating one or more control signals in response to multiple rollover detection thresholds.

Figures 2, 3:
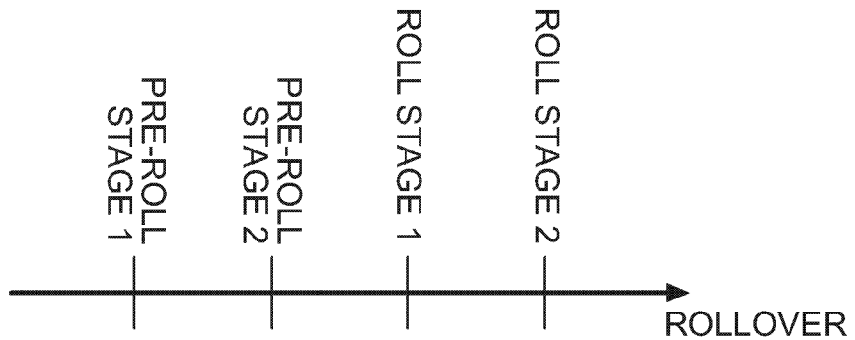
FIG. 2 illustrates four stages of rollover probability or certainty in accordance with the present teachings.
FIG. 3 is a table illustrating an exemplary embodiment of input signal usages for determining various pre-rollover and rollover stages in accordance with the present teachings.

FIG. 2 illustrates four stages of rollover probability or certainty (2 pre-rollover stages and 2 rollover stages) in accordance with the teachings of the present invention. Rollover becomes more certain as the stages move to the right.

FIG. 3 is a table illustrating an exemplary embodiment of signal usages for identifying or determining various pre-rollover and rollover stages in accordance with the present invention. As can be seen, in this embodiment, a roll rate signal is used to determine the pre-rollover stages (Pre-roll stage 1 and Pre-roll stage 2) and rollover stages (Roll stage 1 and Roll stage 2). Roll rate is the rate of change of the vehicle's roll angle. A yaw rate signal is used to determine the pre-rollover stages and a first rollover stage (Roll stage 1). Yaw rate refers to a vehicle's rotation around its vertical axis, and is usually expressed in degrees per second or radians per second. Yaw can be described as the movement of an object turning on its vertical axis, and yaw rate sensors typically determine how far off-axis a car is "spinning." An increase in yaw rate can indicate, for example, a force applied to the vehicle or the vehicle sliding laterally. A steering wheel angle rate signal is used to determine the pre-rollover stages and a first rollover stage. A steering wheel angle signal is used to determine the pre-rollover stages and a first rollover stage. Steering wheel angle is indicative of a degree and direction to which the driver wants the vehicle to turn. Because steering wheel angle is indicative of a driver's intended direction, it can be used with other sensor input to determine whether the vehicle is actually heading in that intended direction (or is understeering or oversteering). Steering wheel angle rate indicates how fast the driver is turning the steering wheel, or how fast the steering wheel is turning without the driver's input. The steering wheel angle rate can be indicative of driver actions that can precipitate a rollover or other vehicle position having a potential for vehicle rollover.

A lateral acceleration signal can be used to determine the pre-rollover stages and rollover stages. A longitudinal acceleration signal can be used to determine the pre-rollover stages. A vertical acceleration signal is used to determine the rollover stages. Lateral acceleration refers to the rate of increase in speed of a vehicle in a sideways direction. Longitudinal acceleration refers to the rate of increase in speed of a vehicle in a forward or rearward direction. Vertical acceleration refers to the rate of increase in speed of a vehicle in a vertical direction. Lateral speed and acceleration indicate that the vehicle is moving sideways and therefore may not be entirely within the driver's control and is in a position that may result in a trip over. Longitudinal speed and acceleration are relevant to an algorithm of the present teachings, because longitudinal momentum can be translated to lateral momentum upon loss of control of the vehicle. Vertical acceleration can be indicative of, for example, a ditch over or a ramp over situation.

A vehicle speed signal can be used to determine a second pre-rollover stage and the rollover stages, for the reasons stated above. A side slip angle or "slip angle" signal can be used to determine a second pre-rollover stage and the rollover stages. Slip angle is the angle between a rolling vehicle's actual direction of travel and the direction toward which it is pointing. One or more tire pressure signals can additionally be used to determine the pre-rollover and rollover stages.

The tire pressure signal(s) can include tire pressure information regarding the right and left front tires and/or the right and left rear tires. The present teachings can simply acknowledge fluctuations in tire pressure, or can perform an assessment of one or more pressure signals on the basis of pressure characteristics corresponding to rollover or near-rollover events, the results being used with other sensor input in certain embodiments of the invention to predict a rollover incident or position of the vehicle that indicates a potential for vehicle rollover.

According to the present teachings, in various exemplary embodiments, assessment of the pressure signals can include comparing the right and left tire pressure signals against a high tire pressure threshold and a low tire pressure threshold, and vice versa, respectively, an assessment being positive (indicating potential rollover) when simultaneously the pressure of the tire(s) on one side of the vehicle are below the low tire pressure threshold and the pressure of the tire(s) on the other side of the vehicle exceeds the high tire pressure threshold. The conditions of such an assessment preferably occur in a predefined time window.

Alternatively, assessment of pressure signals can include measuring a moving average of a number of differences between subsequent left and right tire pressure samples, the assessment being positive when the averages reach the predefined thresholds. Pressure signal assessment can additionally or alternatively include comparing measured pressure characteristics registered in a predefined time window against stored pressure templates representing models of rollover or near-rollover events, the assessment being positive (indicating a potential rollover) if the measured pressures correspond, with predefined precision, to at least one template. The stored templates can be obtained by computer simulations, recorded during real rollover events, and/or forecasted by experts.

Various exemplary embodiments of the present teachings contemplate using other types of signals to determine one or more pre-rollover and rollover stages, for example using an initial roll angle detector, a vehicle mass sensor, and moment of inertia detectors. One skilled in the art would understand how signals from each of these sensors are applicable to predicting vehicle rollover.

In accordance with some exemplary embodiments, in pre-rollover stage 1, a motorized re-settable retractor or other re-settable device is activated, causing the seat belt webbing to be wound back into a retractor. This allows early reduction or removal of seat belt slack created by occupants that are out of position (OOP), wearing bulky coats, etc. In accordance with some exemplary embodiments, in pre-rollover stage 2, as a rollover event becomes more likely, another re-settable device such as an advanced rollover seat belt buckle, a re-settable seat bolster, or other re-settable device can be activated to further maintain or correct an occupant's position within the vehicle, e.g., by ensuring that seat belt slack does not get re-introduced into a lap belt portion of the seat belt.

Regarding rollover stage 1, the algorithm has determined that rollover is imminent and, in some exemplary embodiments, activation of non-resettable devices begins. In this first rollover stage, non-resettable (e.g., pyro) seat belt pre-tensioning devices are activated, which typically have the ability to remove additional slack from the seat belt webbing because they employ a higher force than previously-deployed retractors. Finally, regarding rollover stage 2, rollover may have begun and, in certain embodiments of the invention, non-resettable containment devices are activated. These devices are designed to contain the occupant in the vehicle during a rollover, and may include, for example, inflatable devices such as a curtain airbag, a safety canopy, front airbags, and side airbags. Containing an occupant within a vehicle, and additionally in a position at which inflatable devices are most helpful, can reduce the chances and severity of injuries from impacts including rollovers.

Figure 4:
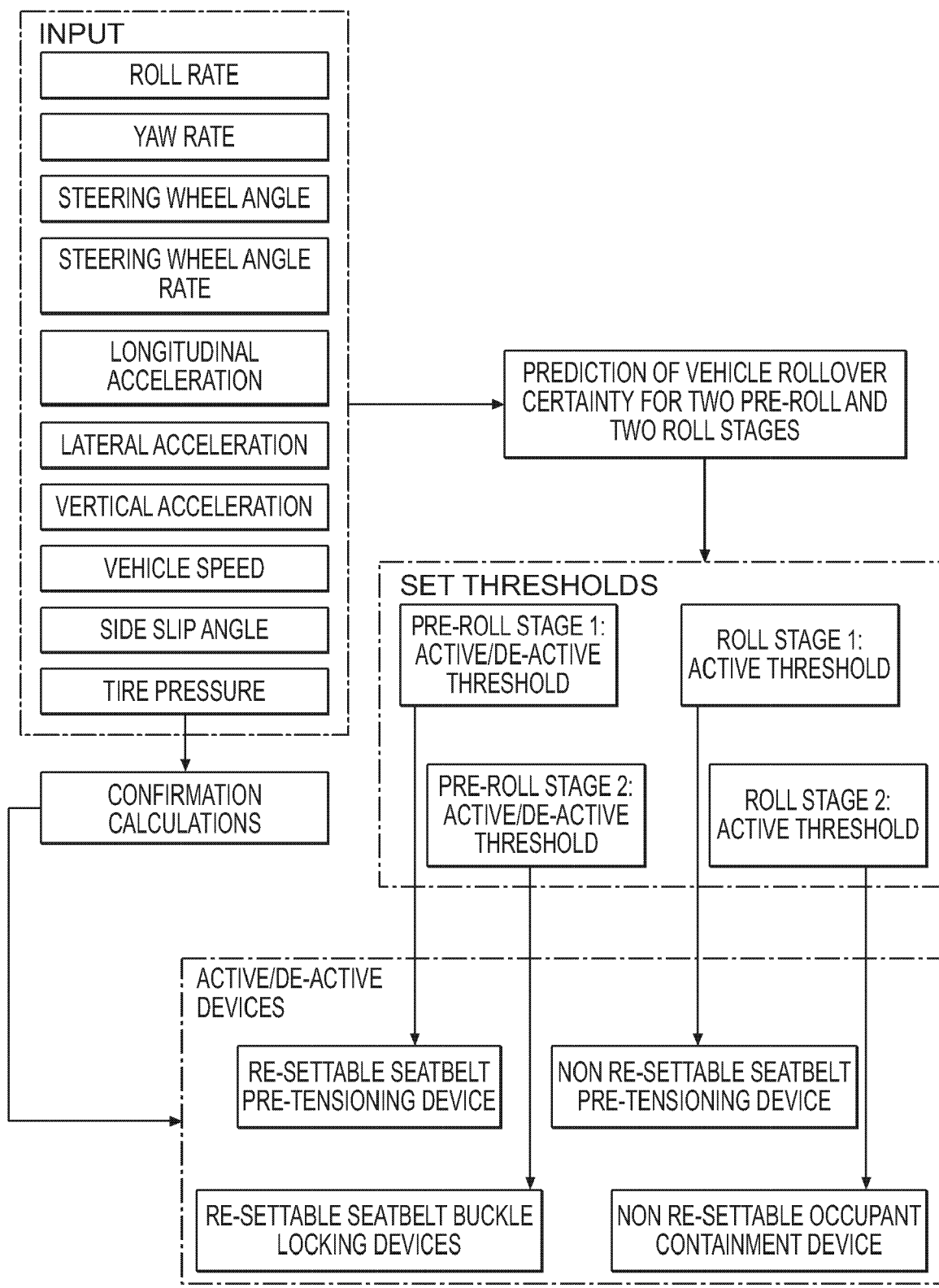
FIG. 4 illustrates an algorithm schematic for pre-rollover and rollover prediction and occupant restraint system deployment in accordance with exemplary embodiment of the present teachings.

FIG. 4 illustrates an algorithm schematic for pre-rollover and rollover prediction and occupant restraint system deployment in accordance with various exemplary embodiments of the present teachings. As illustrated, input signals such as roll rate, yaw rate, steering wheel angle rate, steering wheel angle, longitudinal acceleration, lateral acceleration, vertical acceleration, vehicle speed, side slip angle, and tire pressure are used to predict vehicle rollover probability for the pre-rollover and rollover stages.

After vehicle rollover probability is predicted, it is compared to certain thresholds that can be predetermined or dynamically determined. The present teachings contemplate a variety of threshold bases aimed at predicting the possibility of rollover events or vehicle position indicating a potential for vehicle rollover early based on vehicle position and momentum. The bases for such thresholds will vary depending on, for example, the type of vehicle and the various types of rollovers. A trip over, for example, has different pre-rollover vehicle characteristics (relevant to at least pre-rollover stages 1 and 2) than a ramp over or a ditch over. In a trip over, for example, lateral speed and acceleration of a vehicle have a high importance in determining whether a threshold is met. In a ditch over or ramp over, however, vertical acceleration, pitch, and roll angle play a more important roll in evaluating whether at least the pre-rollover thresholds are being met.

As shown in FIG. 4, pre-rollover stage 1 threshold is an active/de-active threshold, which means that resettable devices are activated and can be deactivated if it is determined that a rollover is not going to occur. If pre-rollover stage 1 threshold is reached, re-settable pre-tensioning devices are activated. If, following activation of the re-settable pre-tensioning devices, the value(s) causing threshold attainment fall below the pre-rollover stage 1 threshold (signifying that a rollover event is not predicted to take place), the re-settable pre-tensioning devices are deactivated and reset. Pre-rollover stage 2 threshold is also an active/de-active threshold. If pre-rollover stage 2 threshold is reached, additional re-settable devices are activated. If, following activation of the additional re-settable devices, the value(s) causing threshold attainment fall below the pre-rollover stage 2 threshold (signifying that a rollover event is no longer predicted to take place with the same degree of certainty), the re-settable seat belt buckle locking devices are deactivated and reset.

The rollover stage 1 threshold is an active threshold, wherein non-resettable restraint devices are activated or deployed. If rollover stage 1 threshold is reached, non-resettable pre-tensioning devices are activated. If, following activation of the non-resettable pre-tensioning devices, the value(s) causing threshold attainment fall below the threshold, the non-resettable pre-tensioning devices are not reset. The rollover stage 2 threshold is also an active threshold. If rollover stage 2 threshold is reached, non-resettable occupant containment devices are activated. If, following activation of the non-resettable occupant containment devices, the value(s) causing threshold attainment fall below the threshold, the non-resettable occupant containment devices are not reset.

Confirmation of calculations occurs in the embodiment of FIG. 4 as a safing feature, which is an optional step but typically employed in vehicle safety systems.

Figure 5:
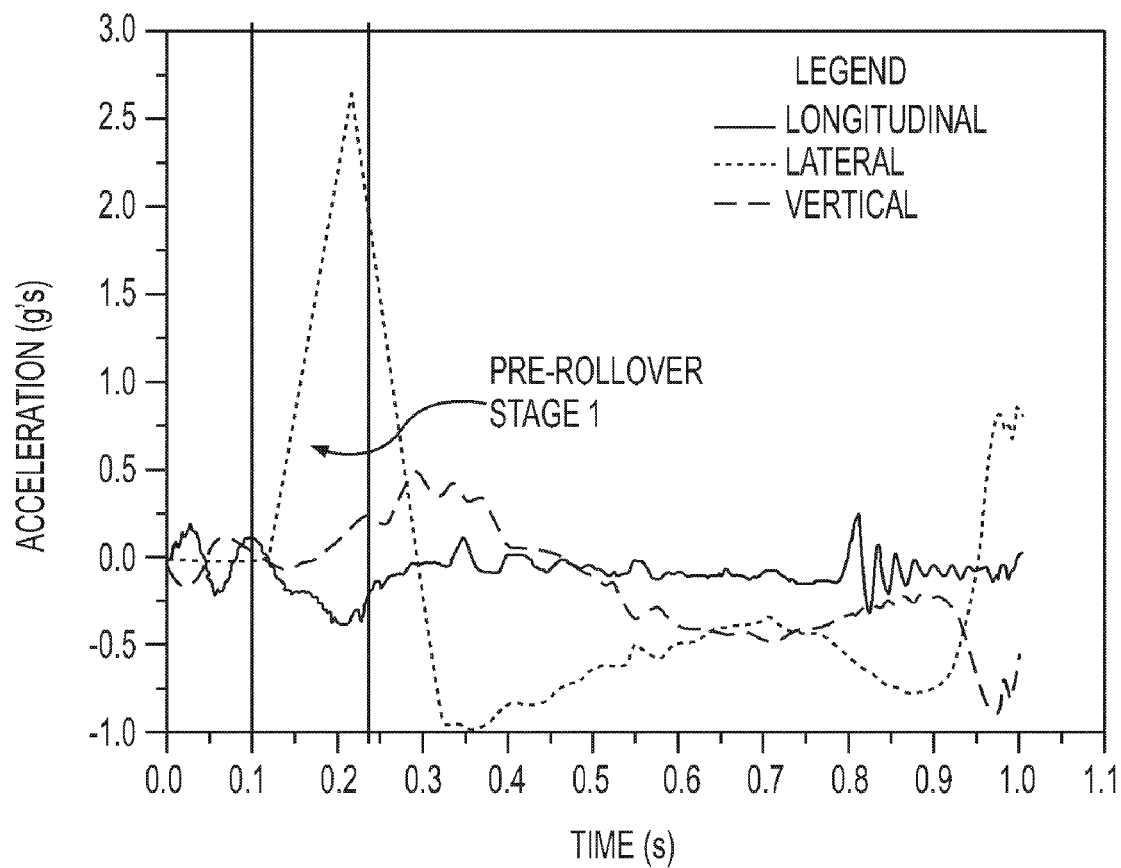
FIG. 5 illustrates an exemplary determination of a pre-rollover stage 1 in accordance with exemplary embodiment of the present teachings.

In an exemplary implementation of an algorithm of the present teachings, the pre-rollover and rollover thresholds are determined in the following manner for a trip over event that takes place with a vehicle traveling at about 70 mph. The type of trip over used for the exemplary implementation statistics is a friction buildup similar to a soil trip over. FIG. 5 illustrates determination of pre-rollover stage 1, which—in the illustrated embodiment—can be determined solely by the vehicle's lateral speed and acceleration. In the illustrated exemplary embodiment, pre-rollover stage 1 is determined in a timeframe of about 0.1 seconds to about 0.2 seconds. As can be seen, a sharp increase in lateral speed and acceleration can overcome the pre-roll stage 1 threshold, causing, for example, activation of a resettable electric seat belt retractor to maintain occupant position and prepare for a possible rollover event. The present teachings can, for example, determine that pre-rollover stage 1 has been reached when a lateral acceleration of 1G is met on flat terrain. The present teachings contemplate other sensor readings causing the pre-rollover stage 1 threshold to be met, with lateral speed and acceleration being a single early vehicle behavior that can be sufficiently indicative of roll potential to warrant activation of resettable restraint devices.

Figure 6A:
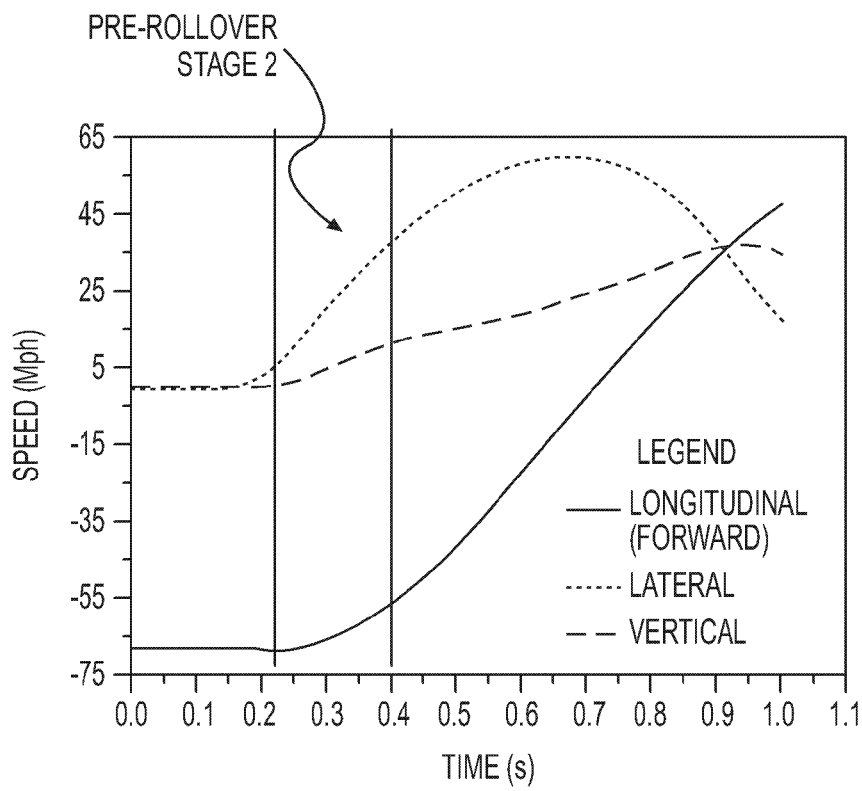
FIGS. 6A and 6B illustrate an exemplary determination of a pre-rollover stage 2 in accordance with exemplary embodiment of the present teachings.
Figure 6B:
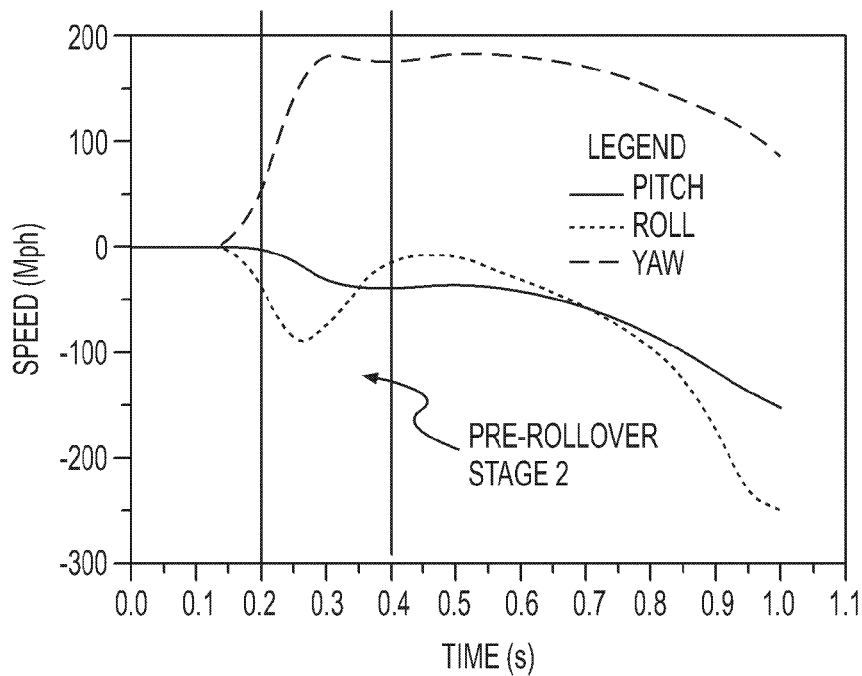

For the exemplary 70 mph soil trip over implementation, FIGS. 6A and 6B illustrate determination of a pre-rollover stage 2, which can be predicted by the vehicle's lateral and perhaps vertical speed, as well as a change in yaw angle (not shown), yaw rate, and roll rate. The sensor readings in FIGS. 6A and 6B are overall indicative of the vehicle changing its orientation—going from forward movement to lateral movement. Indeed, the readings illustrated in pre-roll stage 2 are indicative of a change in yaw angle occurring. In the illustrated exemplary embodiment, pre-rollover stage 2 is determined in a timeframe of about 0.2 seconds to about 0.4 seconds. During this level of roll certainty, where a trip has occurred or is imminent, additional resettable devices can be deployed to maintain the occupants' positions in the vehicle and further prepare for a possible rollover event, such as a resettable seat bolster to hold the occupant in his seat.

Figure 7A:
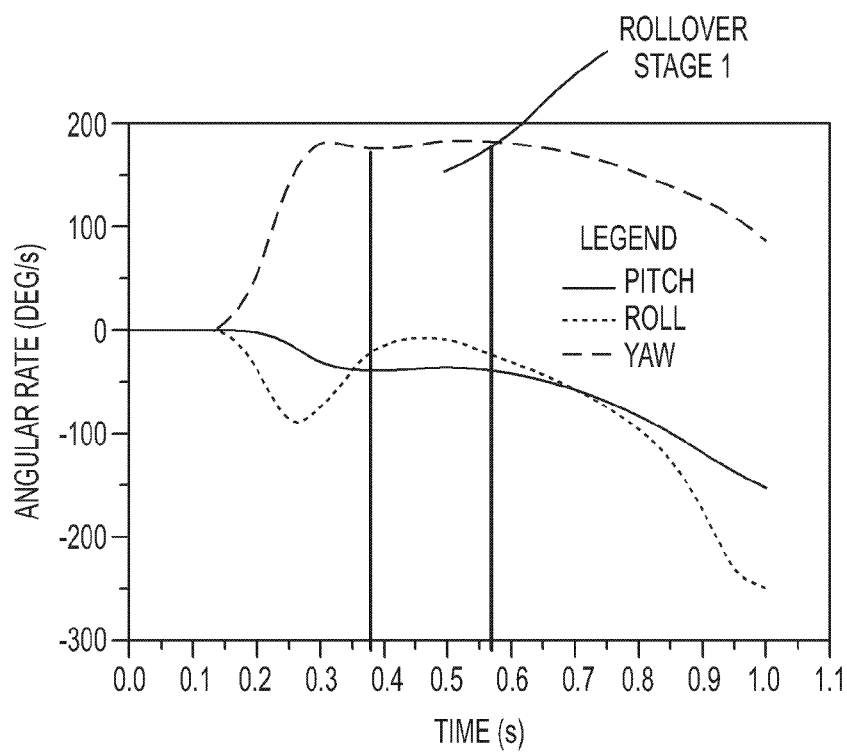
FIGS. 7A and 7B illustrate an exemplary determination of rollover stage 1 in accordance with exemplary embodiment of the present teachings.
Figure 7B:
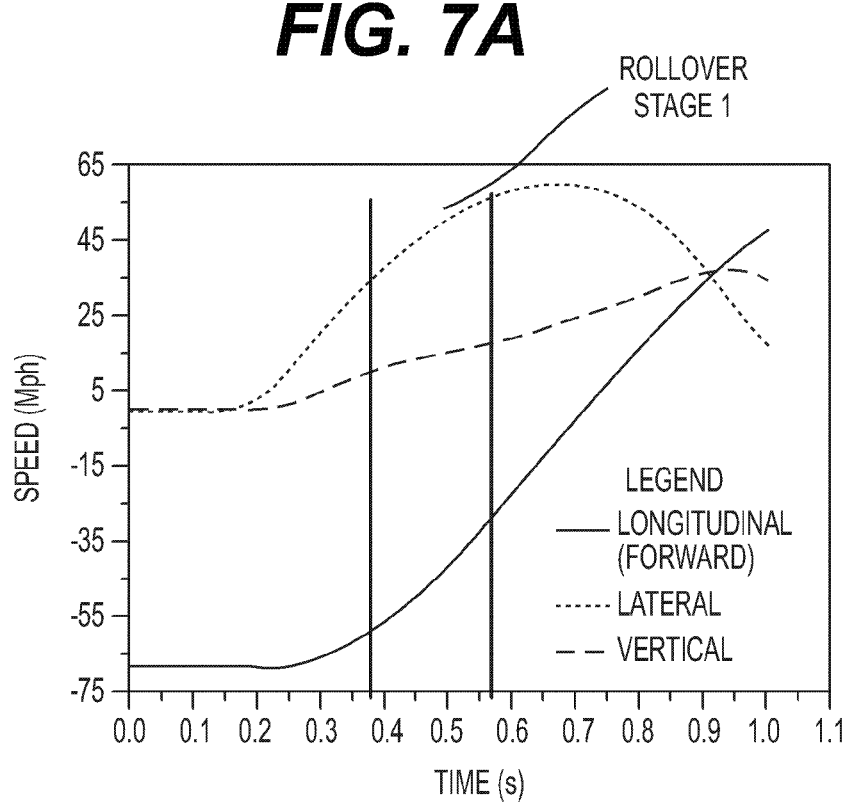

For the exemplary implementation, FIGS. 7A and 7B illustrate determination of a rollover stage 1, which can be predicted by vehicle lateral speed, yaw and roll rates, and yaw and roll angles (not shown). In the illustrated exemplary embodiment, rollover stage 1 is determined in a timeframe of about 0.4 seconds to about 0.55 seconds. Lateral and vertical acceleration are increasing and yaw rate is high. Roll rate is also increasing. In this scenario, rollover is now imminent and the roll angle is beginning to change, as may be yaw angle as the vehicle's longitudinal movement may continue to translate to lateral movement. When rollover stage 1 threshold is met, activation of non-resettable restraint devices such as buckle-mounted pyro-mechanical pretensioners can occur, as a rollover event is sufficiently likely. Buckle-mounted pyro-mechanical pretensioners can apply a greater force than resettable pretensioners, thereby taking up additional slack in the seat belt to better maintain occupant positions and further prepare for an imminent rollover event.

In the illustrated scenario, the trip that causes the trip over can occur during either pre-rollover stage 2 or rollover stage 1.

Figure 8:
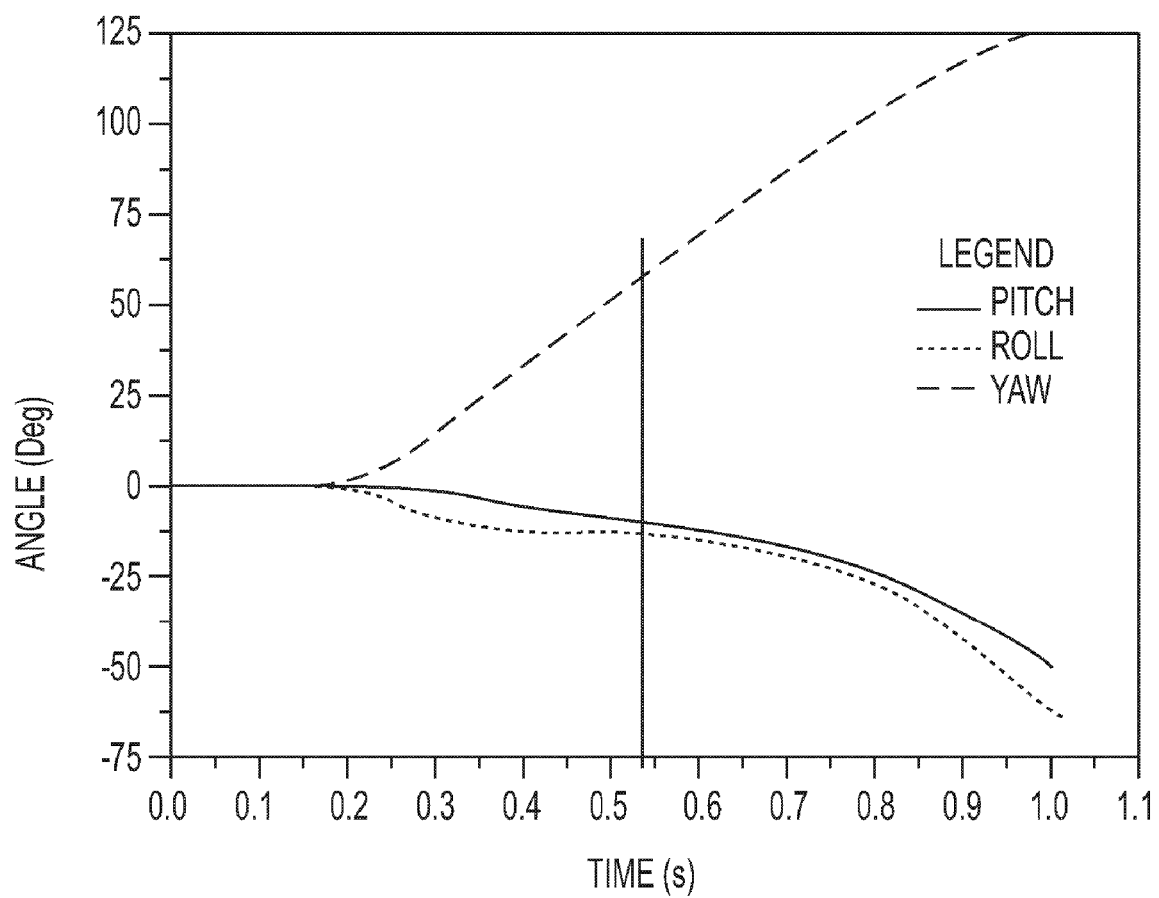
FIG. 8 illustrates an exemplary determination of rollover stage 2 in accordance with exemplary embodiment of the present teachings.

For the exemplary implementation, FIG. 8 illustrates determination of a rollover stage 2 at about 0.55 seconds, which can be predicted by an increasing roll angle (not shown). In the illustrated embodiment, yaw is increasing sharply and roll rate is decreasing. With a rollover being imminent or occurring in this stage, one or more non-resettable restraint devices such as airbags can be deployed in accordance with the dynamics of the rollover. For example, front airbags may not be deployed in a trip over if there is no forward momentum to throw vehicle occupants toward the windshield. In such a case, inflatable restraint device deployment can be limited to side airbags and/or a safety canopy/curtain.

It should be understood that different input signals can be used to determine the pre-rollover and rollover stages of the present teachings, for example in different actions that cause a rollover, such as a trip over, a ramp over, and a ditch over. Different actions causing rollovers can require differing restraint system deployment stages and rates. For example, a trip over requires a faster deployment than a ramp over, and may only require deployment of passive safety restraints and side impact inflatable devices.

It should be noted that not all of the functions and features described in detail herein are necessary for a complete and functional expression of the invention. No one (or more)

described element or feature is implicitly, explicitly, or inherently critical or necessary to the operation of the invention, except as explicitly described herein. For example, the present invention contemplates any number of pre-rollover and rollover stages in predicting rollover probability. Indeed, there need not be the same number of pre-rollover stages as there are rollover stages. For example, the present invention contemplates three pre-rollover stages and two rollover stages. In addition, the present invention is not limited to deployment of re-settable occupant restraint devices in pre-rollover stages and deployment of non-resettable occupant restraint devices in rollover stages.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a range of "less than 10" includes any and all subranges between (and including) the minimum value of zero and the maximum value of 10, that is, any and all subranges having a minimum value of equal to or greater than zero and a maximum value of equal to or less than 10, e.g., 1 to 5.

It is noted that, as used in this specification and the appended claims, the singular forms "a," "an," and "the," include plural referents unless expressly and unequivocally limited to one referent. Thus, for example, reference to "a restraint device" includes two or more different restraint devices. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the methodologies of the present disclosure without departing from the scope its teachings. Other embodiments of the disclosure will be apparent to those skilled in the art from consideration of the specification and practice of the teachings disclosed herein. It is intended that the specification and examples be considered as exemplary only.

What is claimed is:

1. A method for predicting vehicle rollover and activating an occupant restraint system, the method comprising:
   receiving input signals for early detection of one or more of a vehicle position and vehicle movement that indicate a potential for vehicle rollover;
   activating at least a first resettable restraint device when a first pre-rollover stage threshold has been met, based on a comparison with at least some of the input signals;
   activating at least a second resettable restraint device when a second pre-rollover stage threshold has been met, based on a comparison with at least some of the input signals;
   activating at least a first non-resettable restraint device when a first rollover stage threshold has been met, based on a comparison with at least some of the input signals; and
   activating at least a second non-resettable restraint device when the second rollover stage threshold has been met, based on a comparison with at least some of the input signals.

2. The method of claim 1, further comprising deactivating the activated first resettable restraint device when the first pre-rollover stage threshold is no longer met.

3. The method of claim 2, further comprising deactivating the activated second resettable restraint device when the second pre-rollover stage threshold is no longer met.

4. The method of claim 3, wherein the resettable restraint devices comprise one or more of a motorized electric or conventional load limiting retractor, an advanced rollover seat belt buckle, and a resettable seat bolster.

5. The method of claim 1, wherein the input signals comprise one or more of a roll rate, a roll angle, a yaw rate, a steering wheel rate, a steering wheel angle, a lateral acceleration, a vertical acceleration, a vehicle speed, a side slip angle, and a tire pressure.

6. The method of claim 1, wherein the input signals used to indicate the first pre-rollover stage comprise one or more of lateral speed and acceleration,
   the input signals used to indicate the second pre-rollover stage comprise one or more of lateral speed, vertical speed, yaw angle, yaw rate, and roll rate,
   the input signals used to indicate the first rollover stage comprise one or more of lateral speed, yaw rate, roll rate, yaw angle, and roll angle, and
   the input signal used to indicate the second rollover stage comprises roll angle.

7. A method for detecting one or more of a vehicle position and vehicle movement that indicate a potential for vehicle rollover, and activating an occupant restraint system, the method comprising:
   receiving input signals for early detection of one or more of a vehicle position and vehicle movement that indicate a potential for vehicle rollover; and
   activating restraint devices as each of at least three thresholds are met, based on a comparison of at least some of the input signals, prior to initiation of vehicle rollover to keep vehicle occupants from moving within the vehicle to positions that are less suitable for inflatable restraint device deployment.

8. The method of claim 7, wherein resettable restraint devices are activated when the first two thresholds of the at least three thresholds are met.

9. The method of claim 8, wherein the resettable restraint devices comprise one or more of a motorized electric or conventional load limiting retractor, an advanced rollover seat belt buckle, and a resettable seat bolster.

10. The method of claim 8, wherein activated resettable restraint devices are deactivated as the first two thresholds of the at least three thresholds are no longer met.

11. The method of claim 8, wherein a non-resettable restraint device is activated when the third threshold of the at least three thresholds is met.

12. The method of claim 11, wherein the non-resettable restraint device includes a buckle-mounted pyro-mechanical pretensioner.

13. The method of claim 7, wherein the input signals comprise one or more of a roll rate, a roll angle, a yaw rate, a steering wheel rate, a steering wheel angle, a lateral acceleration, a vertical acceleration, a vehicle speed, a side slip angle, and a tire pressure.

14. An automobile rollover prediction and restraint device deployment system comprising:
- a plurality of automobile data sensors to generate a plurality of data signals; and
- a controller configured to receive the data signals and configured to deploy resettable and non-resettable restraint devices,
- wherein the controller is configured to activate at least one resettable restraint device when one or more of the data signals exceed a first threshold, indicating that the vehicle is in a position or undergoing movement that indicates a potential for vehicle rollover, and to de-activate the at least one resettable restraint device when one or more of the data signals fall below the first threshold.

15. The system of claim 14, wherein the data signals compared to the first threshold include one or more of lateral speed and acceleration.

16. The system of claim 14, wherein the controller is configured to activate at least one additional resettable restraint device when one or more of the data signals exceed a second threshold, and to de-activate the at least one additional resettable restraint device when one or more of the data signals fall below the second threshold.

17. The system of claim 16, wherein the data signals compared to the first threshold include one or more of lateral speed, vertical speed, yaw angle, yaw rate, and roll rate.

18. The system of claim 14, wherein the controller is configured to activate at least one non-resettable restraint device when one or more of the data signals exceed a third threshold.

19. The system of claim 18, wherein the data signals compared to the third threshold include one or more of lateral speed, yaw rate, roll rate, yaw angle, and roll angle.

20. The system of claim 14, wherein the controller is configured to activate at least one additional non-resettable restraint device when one or more of the data signals exceed a fourth threshold.

21. The system of claim 20, wherein a data signal compared to the fourth threshold includes roll angle.

* * * * *